US009759398B2

(12) United States Patent
Godbillon et al.

(10) Patent No.: US 9,759,398 B2
(45) Date of Patent: Sep. 12, 2017

(54) LIGHTING AND/OR SIGNALING DEVICE WHOSE COLOR IS DIFFERENT WHEN IT IS SWITCHED ON OR SWITCHED OFF

(71) Applicant: Valeo Vision, Bobigny (FR)

(72) Inventors: Vincent Godbillon, Paris (FR); Pierre Albou, Paris (FR)

(73) Assignee: Valeo Vision, Bobigny (FR)

( * ) Notice: Subject to any disclaimer, the term of this patent is extended or adjusted under 35 U.S.C. 154(b) by 488 days.

(21) Appl. No.: 14/451,530

(22) Filed: Aug. 5, 2014

(65) Prior Publication Data
US 2015/0036370 A1    Feb. 5, 2015

(30) Foreign Application Priority Data

Aug. 5, 2013    (FR) ..................... 13 57768

(51) Int. Cl.
*B60Q 1/04*    (2006.01)
*F21S 8/10*    (2006.01)
*B60Q 1/26*    (2006.01)

(52) U.S. Cl.
CPC ............ *F21S 48/1233* (2013.01); *B60Q 1/04* (2013.01); *B60Q 1/26* (2013.01); *F21S 48/2218* (2013.01)

(58) Field of Classification Search
CPC .... F21S 48/1233; F21S 48/2218; B60Q 1/04; B60Q 1/26
See application file for complete search history.

(56) References Cited

U.S. PATENT DOCUMENTS

| 4,868,725 A | 9/1989 | Sakagawa et al. |
| 7,137,718 B2 | 11/2006 | Egashira |
| 2004/0218400 A1 | 11/2004 | Egashira |

FOREIGN PATENT DOCUMENTS

| DE | 19940667 A1 | 3/2001 |
| EP | 0211742 A1 | 2/1987 |
| EP | 0677696 | 10/1995 |
| EP | 0697309 A2 | 2/1996 |
| FR | 1538446 | 9/1968 |

*Primary Examiner* — Thomas M Sember
(74) *Attorney, Agent, or Firm* — Jacox, Meckstroth & Jenkins

(57) ABSTRACT

A lighting and/or signaling device, especially for automotive vehicle, comprising an optical system furnished with a light source (S) configured to emit a light beam in an initial color (F1), the device furthermore comprising a glass cover (3) disposed so as to be traversed by the beam, the glass cover (3) being colored in such a way as to transmit the beam in a resulting color (F2). According to the invention the device furthermore comprises a filter configured so as to make the resulting color (F2) of beam closely similar to its initial color (F1).

21 Claims, 3 Drawing Sheets

Figure 1:
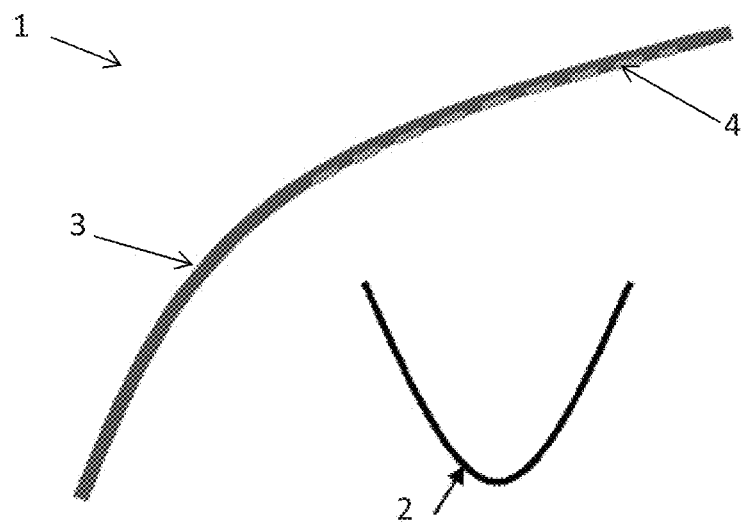

LIGHTING AND/OR SIGNALING DEVICE WHOSE COLOR IS DIFFERENT WHEN IT IS SWITCHED ON OR SWITCHED OFF

CROSS-REFERENCE TO RELATED APPLICATIONS

This application claims priority to French Application No. 1357768 filed Aug. 5, 2013, which is incorporated herein by reference and made a part hereof.

BACKGROUND OF THE INVENTION

1. Field of the Invention

The present invention relates to a lighting and/or signaling device, especially for automotive vehicles. It is in particular intended for position lamps, blinkers or stop lamps.

2. Description of the Related Art

In this sector, it is known to use luminous systems furnished with a light source, in general a light-emitting diode and a glass cover through which a light beam issuing from the source propagates. The glass cover serves both as protection for the luminous system and as complementary element of the bodyshell of the vehicle in relation to aerodynamic and esthetic aspects.

Strict rules embrace the possible choices of colors and intensities for the light beams of these devices. Thus, each function has a specific color, for example amber for the blinker, red for the stop lamp or the rear position lamp, or white for the reversing lamp and the front position lamp. Specific ranges allowed for these colors are defined in the international space. Other criteria also exist relating to the color of the glass cover of the device.

Moreover, it is known that constructors desire to distinguish themselves, especially with visually original elements, so as to be more easily identifiable with respect to competitors. A way of distinguishing oneself consists in having the glass cover of a first color and the beam emitted by the device in a second color different from the first. Thus, when the device is switched on, it emits a beam in a color corresponding to the function of the lamp, but when it is switched off, the color of the glass cover gives the lamp a different esthetic aspect. For example, it is possible to seek to have a lamp with a blinker function by emitting a beam issuing from a source of amber-tinted color and having a red colored glass cover for aesthetic reasons. Indeed, today, certain constructors desire to have the glass covers of the largest possible number of lamps of a similar, or indeed identical, color so as to make all the lamps appear uniform when they are switched off.

However, the drawback of these devices is that the color of the glass cover modifies the color of the light beam emitted by the light source. Indeed, the glass cover acts as a filter which allows through mainly the light whose wavelengths are close to its color. The deeper the color of the glass cover, the more significant the filtering.

Another problem stems from the fact that certain light sources, such as diodes, do not operate in the same manner at all temperatures. The higher the temperature of the diode, the more the color of the beam that it emits deviates toward a deeper color. Now, in normal use, the temperature of the diode reaches values of more than 80° C.

Furthermore, in certain countries standards exist regarding the color that the glass cover must have when the device is switched off. In particular, in the United States, red or amber glass covers must be sufficiently deeply colored. For cost reasons, it is important to provide a single device tailored to several countries, especially for the United States and Europe.

SUMMARY OF THE INVENTION

The invention is therefore aimed at obtaining a device capable of emitting a beam in a color corresponding to the desired function, with a glass cover of a different color which is sufficiently deep to meet the standards enacted in various countries.

Accordingly, the lighting and/or signaling device, especially for automotive vehicle, comprises an optical system furnished with a light source configured to emit a light beam in an initial color, the device furthermore comprising a glass cover disposed so as to be traversed by the beam, the glass cover being colored in such a way as to transmit the beam in a resulting color.

According to the invention, the device furthermore comprises a filter configured so as to make the resulting color of the beam closely similar to its initial color.

The foregoing is intended to mean that the color resulting with the device of the invention is closer to the initial color with the resulting color which would be emitted by the same device, but without a filter.

This yields a lighting device which emits a light beam in one color when the device is switched on, and exhibiting a different color when it is switched off. It makes it possible to meet all the criteria demanded in several countries, relating as much to the color of the beam as to that of the glass cover. This yields a tailored single version, which simplifies the manufacture and logistics thereof for automobile constructors.

By making the resulting color closely similar to the initial color, the filter attenuates the effect of the glass cover on the color of the beam and makes it possible to distinctly differentiate the two colors.

This device furthermore affords the possibility of using light-emitting diodes at higher temperatures, since the filter can also serve to attenuate the temperature-engendered shift in the color of the diode, toward a darker color.

According to various embodiments of the invention, which may be taken together or separately:
- the filter is disposed between the source and the glass cover, in the optical path of the beam,
- the wavelength value range of the initial color is centered around a first wavelength value and the value range of the resulting color is centered around a second wavelength value,
- the filter is configured so as to reduce the intensity of the wavelengths of the value range of the initial color of the beam which are the closest to the value range of the wavelengths transmitted by the glass cover,
- the first and the second wavelength values correspond to an amber-tinted color,
- the wavelengths transmitted by the glass cover correspond to red,
- the filter is an interferential filter,
- the filter is a band-stop filter defining at least one cutoff range which stops the transmission of certain wavelengths,
- at least one, so-called active, of the cutoffs is centered around a wavelength value, the value being chosen between the first wavelength value of the initial color and the wavelength value of the color of the glass cover, the initial color extends in a wavelength range between a lower wavelength and an upper wavelength, the wavelength value on which the active cutoff is centered corresponding to the upper wavelength or to the lower wavelength, the filter exhibits at least one additional cutoff zone situated below a cutoff zone of the glass cover and/or above a zone of perception by the eye, the filter is deposited on a face of the glass cover by surface treatment, the filter is deposited on an insert by surface treatment, the insert being disposed on a face of the glass cover, the face is oriented toward the light source, the filter is deposited on the optical system by surface treatment, the filter is deposited on a transparent screen, the screen being in proximity to the optical system.

The invention will be better understood in the light of the following description which is given solely by way of indication and the aim of which is not to limit it, accompanied by the attached drawings:

BRIEF DESCRIPTION OF THE ACCOMPANYING DRAWINGS

Figure 2:
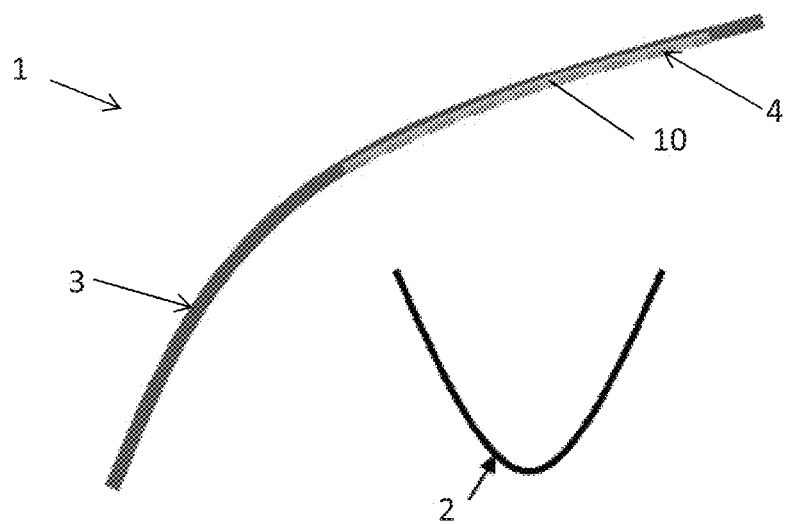
Figure 3:
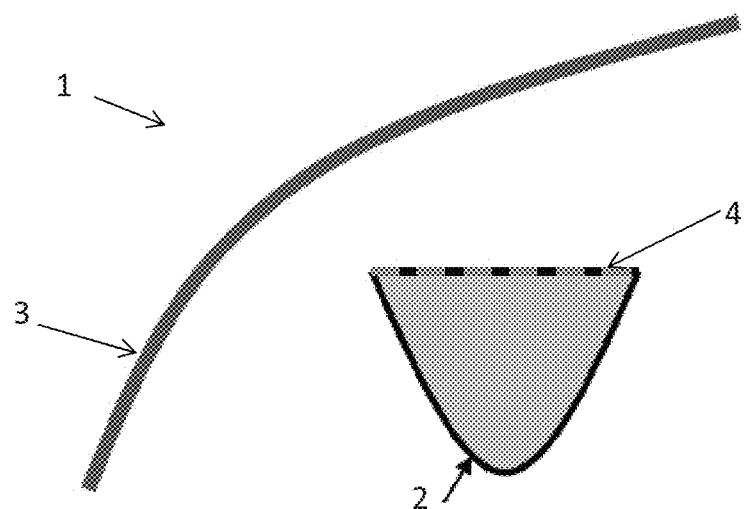
Figure 4:
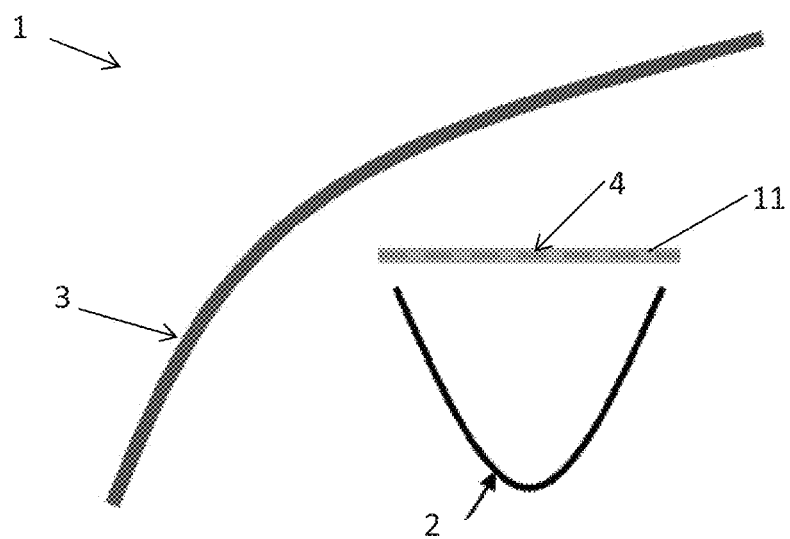
Figure 5:
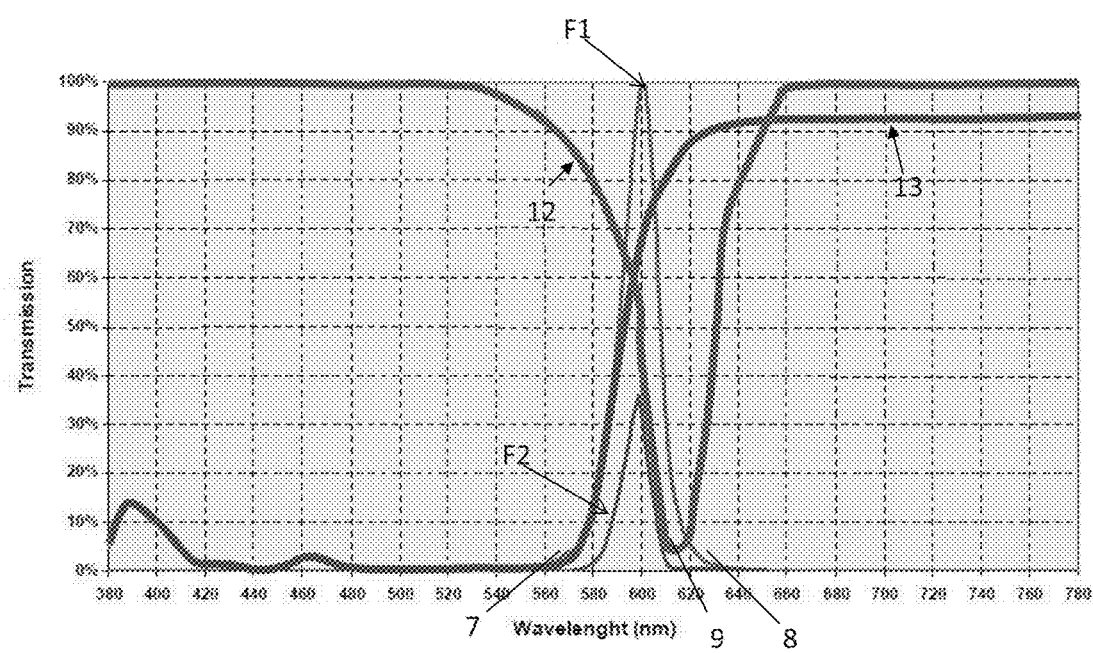

FIG. 1, illustrating in a schematic manner, a sectional view of a lighting and/or signaling device according to a first embodiment of the invention;

FIG. 2 illustrating in a schematic manner, a sectional view of a lighting and/or signaling device according to a second embodiment of the invention;

FIG. 3 illustrating in a schematic manner, a sectional view of a lighting and/or signaling device according to a third embodiment of the invention;

FIG. 4, illustrating in a schematic manner, a sectional view of a lighting and/or signaling device according to a fourth embodiment of the invention; and FIG. 5 showing a graph of the wavelengths transmitted through an exemplary device according to the invention.

DETAILED DESCRIPTION OF THE PREFERRED EMBODIMENTS

As illustrated in FIGS. 1 to 4, the invention relates to a lighting and/or signaling device 1 especially for automotive vehicle, comprising an optical system 2 furnished with a light source, not represented, configured to emit a light beam in an initial color F1 (FIG. 5). The initial color F1 extends in a wavelength range between a lower wavelength 7 and an upper wavelength 8. Here, the initial color F1 corresponds to the color amber, approximately 592 nm, to obtain a blinker function.

In FIGS. 1 to 4, the device also comprises a glass cover 3 disposed so as to be traversed by the beam, the glass cover 3 being colored in such a way as to transmit the beam in a resulting color F2 (FIG. 5). Here, the wavelengths transmitted by the glass cover 3 correspond to red, when the glass cover is illuminated by a standard illuminant A. The illuminant A is a light source emitting a beam of spectrally defined white color. It is customarily used in the automotive sector and makes it possible to measure the value of the wavelengths transmitted by a glass cover. Thus, the exterior aspect of the lamp is red when the device is switched off, so as to have several lamps of the same color when they are not switched on.

The device furthermore comprises an interferential filter 4 disposed in the optical path of the beam, between the source and the glass cover 3, so as to act on the beam emitted by the source while remaining protected inside the device. The filter 4 is configured so as to reduce the intensity of the wavelengths of the value range of the initial color F1 of the beam which are the closest to the value of the wavelength of the color of the glass cover 3. It modifies the color of the beam so that the resulting color F2 of the beam is closer to its initial color F1, that is to say amber-tinted. In the example considered, the filter 4 attenuates the wavelengths corresponding to the colors close to red and retains the wavelengths closest to yellow.

As illustrated in FIG. 5, the initial color F1 has a wavelength value range, from 560 to 630 nm approximately, exhibiting a maximum around a first wavelength value, corresponding to an amber-tinted color of approximately 592 nm.

The red glass cover 3 has the effect of a high-pass filter, whose transmission spectrum 13 is represented in the graph of FIG. 5. It allows through the red wavelengths, above 620 nm, and blocks most of those which have smaller wavelengths, below 560 nm, such as those of the colors blue or green. Moreover, it partly allows through the yellow wavelengths, from 560 to 590 nm approximately, and the amber-tinted and orange wavelengths, from 590 to 620 nm approximately. Thus, the beam which passes through the glass cover 3 emerges with a color closer to red, than to the initial color F1, when there is no filter 4.

The interferential filter 4 is a band-stop filter whose transmission spectrum 12 is represented in the graph of FIG. 5. The filter 4 defines a cutoff range which stops the transmission of certain wavelengths; here, between 540 and 660 nm approximately. The so-called active cutoff is centered around a wavelength value 9 chosen between the first wavelength value of the initial color F1, namely approximately 592 nm as will be recalled, and the wavelength value of the color of the glass cover 3, namely above 620 nm as will be recalled. Here, the cutoff range exhibits a minimum centered on a value of approximately 615 nm, that is to say approximately on the wavelength value corresponding to the upper wavelength 8 of the initial color.

Thus, the beam issuing from the source undergoes on the one hand, the effect of the high-pass filter of the glass cover 3, which allows through better the wavelengths closest to red of the beam. On the other hand, the effect of the bandstop filter of the interferential filter 4 is to block the transmission of the wavelengths closest to red of the beam. The glass cover 3 shifts the color of the beam toward red and the filter 4 shifts the color of the beam toward yellow. Thus, the interferential filter 4 offsets the effect of the glass cover 3, so that the resulting color F2 of the beam is close to the initial color F1, here the amber-tinted color, as will be recalled.

In the graph of FIG. 5, the value range of the resulting color F1 is centered around a second wavelength value, approximately 592 nm, close to the first value, and which also corresponds to an amber-tinted color.

The wavelength values given are merely indicative of the example considered and will of course be tailored to each choice of color without departing from the invention.

The filter 4 will also be able to exhibit one or more zones of additional cutoff, situated below the cutoff zone of the glass cover and another cutoff zone situated above the zone of perception by the eye, which are not represented in FIG. 5. The bottom cutoff or cutoffs have no effect on the resulting color F2 since the glass cover produces the same effect in this zone of wavelength values. Likewise, the top cutoff or cutoffs have no effect either, since they relate to wavelengths which are not visible to the eye.

This type of filter 4 is commonplace and easy to manufacture, it can therefore readily be used for a device 1 in accordance with the invention and makes it possible to avoid significant manufacturing costs.

Furthermore, the filter 4 will be able to be deposited by surface treatment on parts of the device 1. Several arrangements are possible for disposing the filter 4 between the source and the glass cover 3 in the device 1.

In FIG. 1, according to a first embodiment, it is deposited on a face of the glass cover 3, on the side oriented toward the source. The face being situated on the internal side of the device 1, the filter 4 is protected from exterior impairments.

In a second embodiment represented in FIG. 2, the filter 4 is deposited on an insert 10 disposed on a face of the glass cover 3 oriented toward the light source. The use of an insert 10 is advantageous since it is easier to effect a surface treatment by deposition on an element of this type, having regard to its small size.

In a third embodiment, represented in FIG. 3, the filter 4 is deposited directly on the optical system 2. This mode makes it possible to avoid the use of an additional element in the device 1. In this case the optical system 2 comprises a dioptric collimator on which the filter 4 is deposited, and intended to orient the light rays issuing from the source.

In a preferred embodiment, represented in FIG. 4, the filter 4 is deposited on a transparent screen 11, which is placed in proximity to the light source or to the optical system 2, especially facing and/or in contact with the optical system 2. This mode offers the advantage of having a minimum area of surface treatment to be performed, so as to save production costs related to the surface treatment. Indeed, the width of the beam to be intercepted is then reduced with respect to the width of the beam at the level of the glass cover.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting and/or signaling device, especially for automotive vehicle, comprising an optical system furnished with a light source (S) configured to emit a light beam in an initial color (F1), said device furthermore comprising a glass cover disposed so as to be traversed by said beam, said glass cover being colored in such a way as to transmit said beam in a resulting color (F2), wherein said device furthermore comprises a filter configured so as to make said resulting color (F2) of said beam substantially similar to said initial color (F1);

wherein said initial color (F1) ranges between an initial color lower wavelength and an initial color upper wavelength and exhibits a maximum wavelength around a first wavelength value that generally corresponds to an amber color;

wherein said glass cover allows through red wavelengths above a second wavelength value;

wherein said filter defines a wavelength cutoff range which stops the transmission of wavelengths between a third wavelength value and a fourth wavelength value, with a wavelength cutoff being generally centered around a wavelength cutoff value generally corresponding to said initial color upper wavelength, thereby causing said resulting color (F2) of said beam to have a resulting wavelength that is substantially similar to a wavelength of said initial color (F1).

2. The lighting and/or signaling device according to claim 1, in which the filter is disposed between said light source (S) and said glass cover, in an optical prolongation of the beam.

3. The lighting and/or signaling device according to claim 2, in which the wavelength value range of the initial color (F1) is centered around a first wavelength value and a value range of the resulting color (F2) is centered around a second wavelength value.

4. The lighting and/or signaling device according to claim 2, in which the filter is an interferential filter.

5. The lighting and/or signaling device according to claim 2, in which the filter is a band-stop filter defining at least one cutoff range which stops the transmission of certain wavelengths.

6. The lighting and/or signaling device according to claim 2, in which at least one, so-called active, of the cutoffs is centered around a wavelength value, said value being chosen between the first wavelength value of the initial color (F1) and the wavelength value of the color of the glass cover.

7. The lighting and/or signaling device according to claim 1, in which the wavelength value range of the initial color (F1) is centered around a first wavelength value and a value range of the resulting color (F2) is centered around a second wavelength value.

8. The lighting and/or signaling device according to claim 7, in which said filter is configured so as to reduce the intensity of the wavelengths of the value range of the initial color (F1) of the beam which are the closest to the value range of the wavelengths transmitted by the glass cover.

9. The lighting and/or signaling device according to claim 8, in which the wavelengths transmitted by the glass cover correspond to red.

10. The lighting and/or signaling device according to claim 8, in which the first and the second wavelength values correspond to an amber-tinted color.

11. The lighting and/or signaling device according to claim 7, in which the first and the second wavelength values correspond to an amber-tinted color.

12. The lighting and/or signaling device according to claim 11, in which the wavelengths transmitted by the glass cover correspond to red.

13. The lighting and/or signaling device according to claim 1, in which the filter is an interferential filter.

14. The lighting and/or signaling device according to claim 1, in which the filter is a band-stop filter defining at least one cutoff range which stops the transmission of certain wavelengths.

15. The lighting and/or signaling device according to claim 1, in which at least one, so-called active, of the cutoffs is centered around a wavelength value, said value being chosen between the first wavelength value of the initial color (F1) and the wavelength value of the color of the glass cover.

16. The lighting and/or signaling device according to claim 15, in which the initial color (F1) extends in a wavelength range between a lower wavelength and an upper wavelength, the wavelength value on which said active cutoff is centered corresponding to said upper wavelength or to said lower wavelength.

17. The lighting and/or signaling device according to claim 16, in which said filter exhibits at least one additional cutoff zone situated below a cutoff zone of the glass cover and/or above a zone of perception by the eye.

18. The lighting and/or signaling device according to claim 1, in which the filter is deposited on a face of the glass cover by a surface treatment.

19. The lighting and/or signaling device according to claim 1, in which the filter is deposited on an insert by surface treatment, said insert being disposed on a face of the glass cover.

20. The lighting and/or signaling device according to claim 1, in which the filter is deposited on the optical system by surface treatment.

21. The lighting and/or signaling device according to claim 1, in which the filter is deposited on a transparent screen, the screen being in proximity to the optical system.

* * * * *